United States Patent [19]

Hyogo et al.

[11] Patent Number: 4,822,965
[45] Date of Patent: Apr. 18, 1989

[54] LID LOCKING MECHANISM IN AUTOMOBILE SWITCH PANEL DEVICE

[75] Inventors: Yukihiro Hyogo; Kikuo Kimura; Satoshi Iida; Kazuya Arai, all of Shizuoka, Japan

[73] Assignee: Yazaki Corporation, Tokyo, Japan

[21] Appl. No.: 75,507

[22] Filed: Jul. 20, 1987

[30] Foreign Application Priority Data

Jul. 21, 1986 [JP] Japan .............................. 61-111618[U]
Jul. 21, 1986 [JP] Japan .............................. 61-111619[U]

[51] Int. Cl.⁴ ............................................. H01H 13/04
[52] U.S. Cl. .................................... 200/333; 220/335; 220/338; 16/330; 16/353
[58] Field of Search ................ 200/333; 220/335, 337, 220/338; 16/325, 331, 329, 330, 353, 363, 374, 376

[56] References Cited

U.S. PATENT DOCUMENTS

| | | | |
|---|---|---|---|
| 803,747 | 11/1905 | Elvin | 16/330 |
| 2,168,907 | 8/1939 | Leslie | 16/374 |
| 4,658,547 | 4/1987 | Oboza | 16/341 |

Primary Examiner—Henry J. Recla
Assistant Examiner—Linda J. Sholl
Attorney, Agent, or Firm—Armstrong, Nikaido, Marmelstein & Kubovcik

[57] ABSTRACT

A lid lock mechanism in an automobile switch panel device. The mechanism includes an open-top case, a switch panel accommodated in said case, a lid to cover the open-top case, pivotal shafts provided in the open-top case, and clutch members provided in a pair of holes in the lid. At a predetermined opening angle, the lid is maintained in a locked condition while the lid is easily closed manually with a force stronger than a predetermined level.

3 Claims, 3 Drawing Sheets

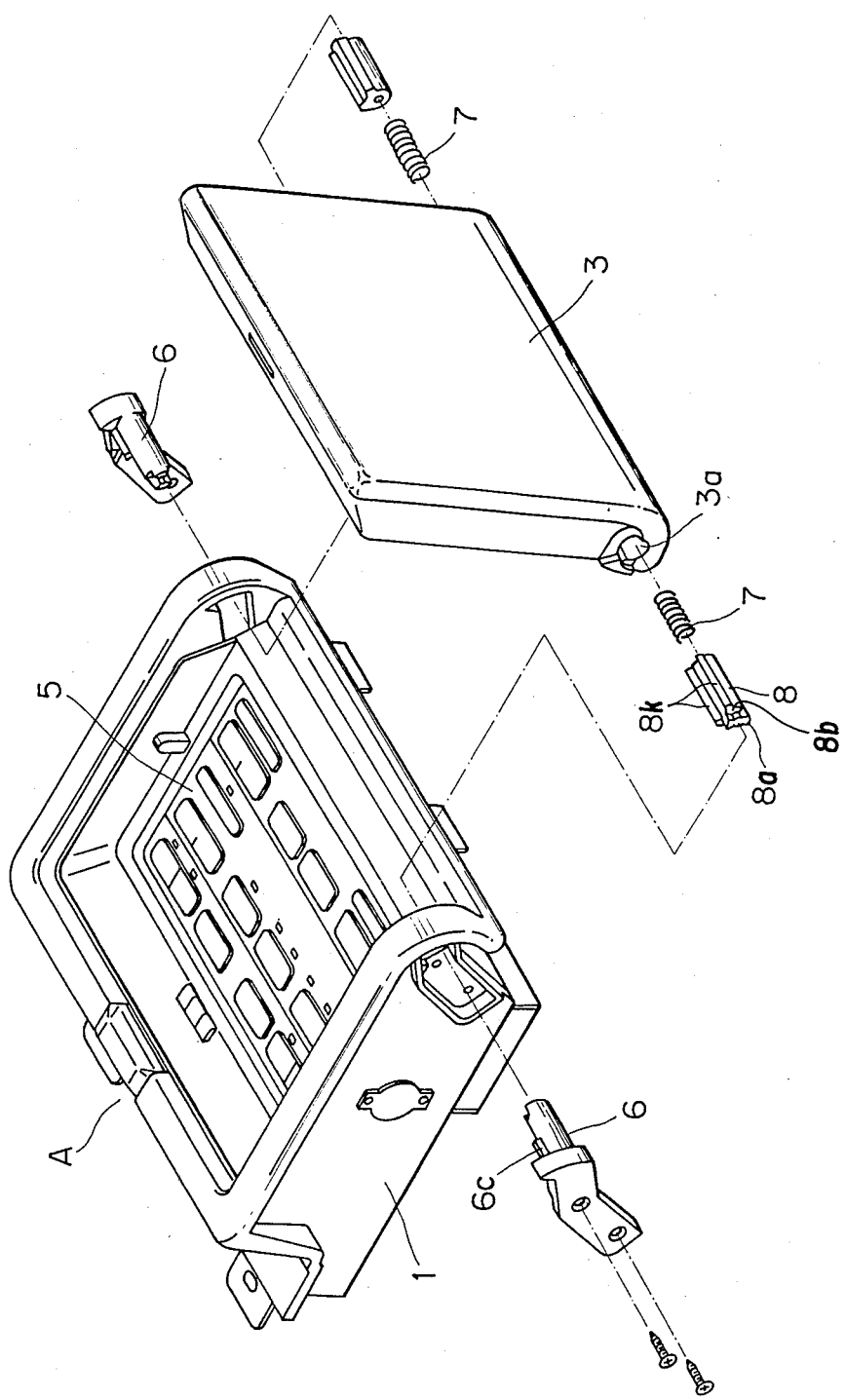

4,822,965

LID LOCKING MECHANISM IN AUTOMOBILE SWITCH PANEL DEVICE

BACKGROUND OF THE INVENTION

The present invention relates to a switch panel device for a vehicle, and more particularly to a lid locking mechanism for maintaining the lid of a remote control unit provided near a rear seat or the like of an automobile opened for the operation of switches on the switch panel.

Some automobiles are provided with a remote control unit beside a rear seat thereof.

The remote control unit has a lid formed by a part of an arm rest beside the rear seat. A switch panel on which switches or the like are arranged is accommodated in the remote control unit. When a passenger in the rear seat opens the lid to operate the switches on the switch panel, he can remotely control air conditioning or the like in the compartment at his own will. Thus, the remote control unit has the advantages that the passenger's convenience may be enhanced, and that the driver may be relieved from the work of switch operation.

While the remote control unit is operated, the lid must be maintained open such that the operation is not hindered.

FIG. 1 shows a conventional remote control unit. In the drawing, a lid 3 is rotatably supported to shafts 2 fixed to a control unit body 1. When the lid 3 is fully opened counterclockwise, it is supported by a bumper 4 formed of rubber or the like which is mounted on the control unit body 1 at a position below the shafts 2, thereby maintaining the lid under the open condition such that the operation of the control unit is not hindered. Further, referring to FIG. 2 which shows a lid locking mechanism in the prior art, the lid 3 is formed at its side surface with a recess 5, while the control unit body 1 is formed with a hole 1a having an opening opposed to the recess 5 under the lid open condition. The opening has a diameter smaller than that of the hole 1a. A spherical guide ball 6 having a diameter greater than that of the opening is inserted into the hole 1a. A spring 7 is inserted into the hole 1a to bias the guide ball 6 in such a manner that the guide ball 6 may be partially projected from the opening.

Accordingly, when the lid 3 is opened as shown in FIG. 1, the guide ball 6 abutting against the end surface of the lid 3 and being maintained retracted is brought into engagement with the recess 5, thereby locking the lid 3 and maintaining the lid under the open condition.

However, the lid 3 under the closed condition constitutes a part of the arm rest in the rear seat of the automobile, and the outer surface of the lid 3 is sometimes trimmed with a cloth or a leather for the purpose of affording a good external appearance to the arm rest.

In this case, when the lid 3 is abutted against the bumper 4, and it is supported by the lid locking mechanism, the nap of the cloth on the outer surface of the lid 3 is flattened by the contact between the cloth and the bumper 4, marring the external appearance of the lid 3. In the case of trimming the outer surface of the lid with a leather, the leather will be similarly damaged, this diminishing the good external appearance of the lid 3.

Further, in forming the lid locking mechanism, a high tolerance of size is required so as to position the recess 5 of the lid 3 in accordance with the guide ball 6 inserted into the hole 1a of the control unit body 1 under the full open condition of the lid 3. Further, it is troublesome to install the guide ball 6 and the spring 7 to be inserted from the inside of the control unit body 1. Additionally, a degree of freedom of design is disadvantageously limited in the conventional lid locking mechanism.

SUMMARY OF THE INVENTION

The present invention eliminates the above-mentioned problems, and provides a lid locking mechanism which may be easily worked and assembled without damaging the outer surface of the lid, and may also save space.

The present invention comprises a lid locking mechanism formed in a lid of a remote control unit and a pivotal shaft for supporting the lid, wherein the lid locking mechanism is adapted to engage at a predetermined open angle of the lid and maintain a lid open condition, and when a lid closing force greater than a predetermined level is applied, the lid locking mechanism is unlocked.

With this arrangement, the lid and the pivotal shaft for supporting the lid are engaged at a predetermined open angle of the lid to maintain the lid open condition. Furthermore, the engagement of the lid and the pivotal shaft may be released by applying a lid closing force greater than the predetermined level.

BRIEF DESCRIPTION OF THE DRAWINGS

FIG. 3 is an exploded view of one embodiment of the present invention;

DETAILED DESCRIPTION OF THE EMBODIMENTS

Figure 1:
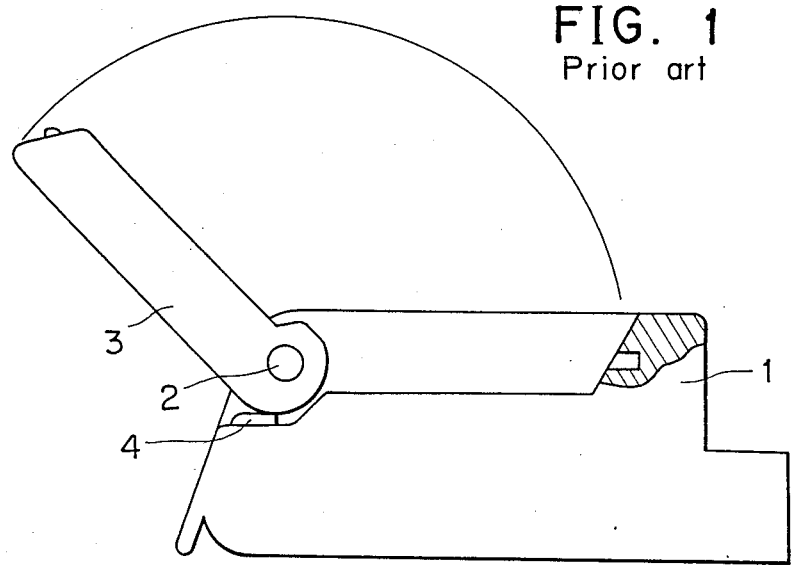
FIG. 1 is an elevational view of the control unit body in the prior art.

There will now be described a preferred embodiment of the present invention with reference to the drawings, in which the same parts as of the prior art are designated by the same reference numerals.

Referring to FIG. 3, a remote control unit A provided in an arm rest beside the rear seat of the automobile is generally constituted of a control unit body 1 including a switch panel 5 provided with switches or the like and an electronic circuit unit (not shown) located under the switch panel 5 and connected to the switches for generating a signal, and of a lid 3 openably supported to a pair of pivotal shafts 6 fixedly attached to the control unit 1.

The lid 3 is formed at both sides with a pair of holes 3a for receiving the pivotal shafts 6. Each hole 3a of the lid 3 is formed at its inner periphery with a pair of key ways. A spring 7 and a clutch member 8 having a pair of keys 8k are inserted into each hole 3a.

The pair of keys 8k of the clutch member 8 are engaged with the pair of key ways of the hole 3a such that the clutch member 8 is axially slidable in the hole 3a with a biasing force of the spring 7 being applied to one end surface of the clutch member 8.

Referring to FIGS. 4A through 5B, the other axial end surface of the clutch member 8, and the opposing axial end surface of the pivotal shaft 6 are formed with respective clutch surfaces to engage with each other.

Figure 4A:
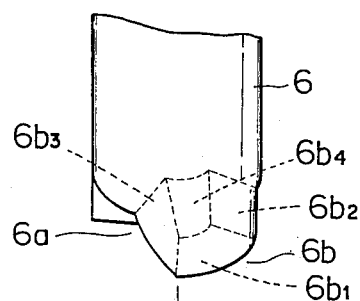
FIG. 4A is an illustration of the pivotal shaft attached to the control unit body.
Figure 5A:
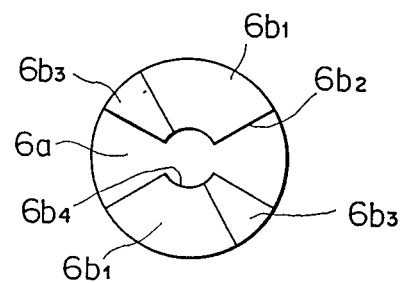
FIG. 5A is an elevational view of the pivotal shaft of FIG. 4A.

The clutch surface of the pivotal shaft 6 is, as shown in FIG. 4A and FIG. 5A, formed of a flat recessed portion $6a$ extending substantially in a diametrical direction and a pair of projecting portions $6b$ on both sides thereof, each having a flat top surface $6b_1$. On both sides of said flat top surface $6b_1$, there are formed a vertical wall $6b_2$ and inclined surface $6b_3$. Further, an intermediate concave surface $6b_4$ is formed to connect said vertical wall $6b_2$ and inclined surface $6b_3$. Thus, the flat recessed portion $6a$ is made contiguous to said flat top surface $6b_1$ by way of the vertical wall $6b_2$, the inclined wall $6b_3$ and the intermediate concave wall $6b_4$.

Figure 4B:
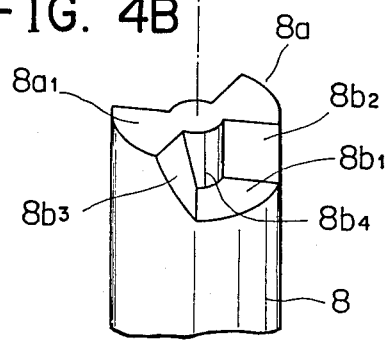
FIG. 4B is an illustration of the clutch member inserted in the lid.
Figure 5B:
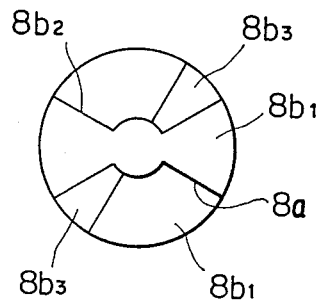
FIG. 5B is an elevational view of the clutch member of FIG. 4B.

On the other hand, the clutch surface of the clutch member 8 has a complementary shape to the clutch surface of the pivotal shaft 6. That is to say, said complementary clutch surface is, as shown in FIG. 4B and FIG. 5B, composed of a projecting portion $8a$ having a flat top surface $8a_1$ extending diametrically at an axial end of the clutch member 8 and recessed portions $8b$ formed on both sides of the projecting portion $8a$. Each recessed portion $8b$ is formed of a flat bottom $8b_1$, a vertical wall $8b_2$, an inclined wall $8b_3$ and an intermediate convex wall $8b_4$ between the vertical wall $8b_2$ and the inclined wall $8b_3$ to connect said walls. Thus, the flat bottom $8b_1$ is made contiguous to said flat top surface $8b$ by way of the vertical wall $8b_2$, the inclined wall $8b_3$ and the intermediate convex wall $8b_4$.

The lid locking mechanism as mentioned above is operated as follows:

When the lid is in a closed condition, the projecting portions $8a$ of the clutch member 8 are abutted against the projecting portion $6b$ of the pivotal shaft 6. As the lid 3 is upwardly rotated to open, the projecting portions $8a$ are also rotated under surface contact with the projecting portion $6b$. When the lid 3 approaches a maximum open angle, the surface contact between the projecting portions $8a$ and the projecting portion $6b$ is released, and both the inclined surfaces $6b_3$ and $8b_3$ are brought into contact with each other. Then, the projecting portions $8a$ are gradually inserted into the recessed portions $6a$.

When the lid 3 reaches the maximum open angle, both the vertical walls $6b_2$ and $8b_2$ are brought into abutting contact with each other, thereby stopping the rotation of the lid 3.

Such an engaged condition of the projecting portions $8a$ in the recessed portions $6a$ is maintained by the biasing force of the spring 7. Accordingly, even when an external force in a lid opening direction is applied to the lid 3, the lid 3 is prevented from being rotated to angles greater than the maximum open angle. Further, when a weak external force in a lid closing direction is applied to the lid 3, the surface clutch is not disengaged.

In the closing operation of the lid 3, when an external force in the lid closing direction is applied to the lid 3 to rotate the clutch member 8 along the inclined surfaces $6b_3$ and $8b_3$ against the biasing force of the spring 7, the projecting portions $8a$ and $6b$ are again brought into abutment against each other, thus releasing the locked condition of the lid 3. After releasing the locked condition of the lid 3, the lid 3 may be closed by a weak external force.

As described above, the lid locking mechanism of the present invention is provided in the lid and the pivotal shafts for supporting the lid. Accordingly, the locking mechanism may be incorporated in the lid.

Figure 6:
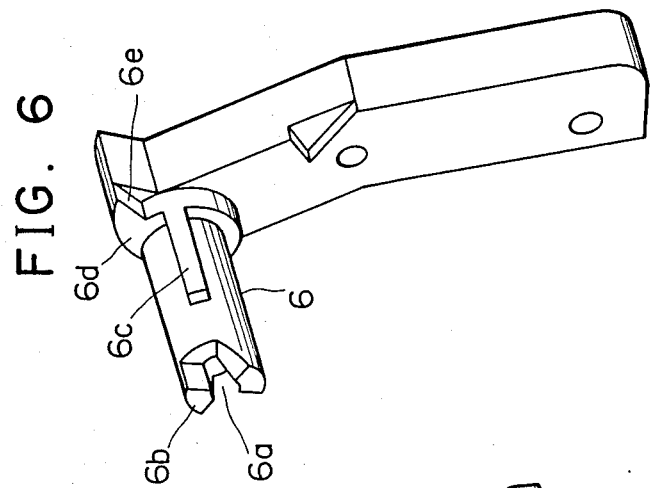
FIGS. 6 and 7 are perspective views of the stoppers provided on the pivotal shaft and the lid.
Figure 7:
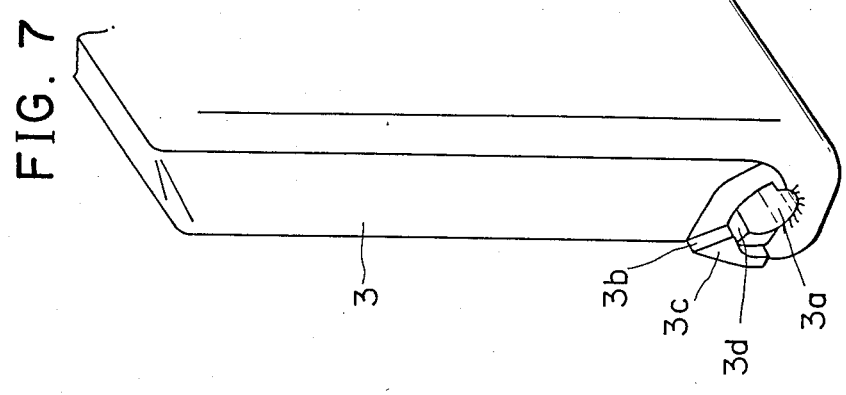
Figure 2:
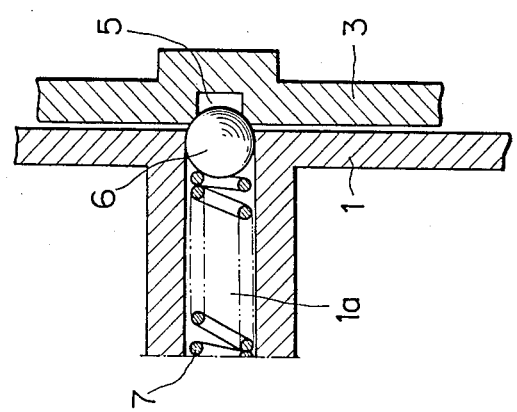
FIG. 2 is a vertical sectional view of the locking mechanism of FIG. 1.

Referring to FIG. 6, the pivotal shaft 6 is formed at its outer periphery with a key-shaped stopper $6c$ on the opposite side of the clutch, and is further formed with a stopper $6d$ having a vertical wall $6e$ on the opposite side of the clutch. Referring to FIG. 7, a stopper $3c$ having a vertical wall $3b$ is formed to project from the end surface of the hole $3a$ of the lid 3. Further, a stopper $3d$ is formed in the hole $3a$ near the end surface thereof so as to make abutment against the stopper $6b$. At the fixed open angle of the lid 3 where the surface clutches $8b$ and $6a$ are engaged, the stoppers $6d$ and $3c$ abut against each other, and the stoppers $6b$ and $3d$ abut against each other.

The lid supporting mechanism as mentioned above is operated as follows:

When the lid 3 is opened to reach a fixed open angle, the surface clutches $6a$ and $8b$ are engaged with each other to stop the lid 3. Simultaneously, the stoppers $6d$ and $3c$ abut against each other, and the stoppers $6b$ and $3d$ abut against each other, thereby supporting the lid 3.

Accordingly, even when an external force F in the lid opening direction is applied to the lid 3 as shown in FIG. 1 to generate a large opening torque, the torque is mainly received by the stoppers $6d$ and $3c$ and the stoppers $6b$ and $3d$, thereby supporting the lid 3 and protecting the surface clutches $6a$ and $8b$ and the key $8a$.

The present invention has the following effects.

(a) As the lid locking mechanism for locking the lid at the maximum open angle may be incorporated in the lid, the outer surface of the lid is not damaged when it is trimmed with a cloth or a leather, and the external appearance is therefore not diminished.

(b) As the external force required for unlocking the lid may be easily adjusted by changing a strength of the spring or changing a length of the clutch member, designing and modification of design may be made easy.

Further, as the locking mechanism is simple in structure, and constructed with a reduced number of parts, it is easily manufactured.

(c) As the pivotal shaft for supporting the lid is commonly utilized for the locking mechanism, it is not necessary to independently provide a locking mechanism as in the prior art. Further, there is no possibility that the locking mechanism is partially exposed to the outside when the lid is opened, thus diminishing the external appearance of the unit body as in the prior art.

(d) The working accuracy of the components of the locking mechanism need not be so high, and the components may be easily assembled.

(e) As the lid supporting mechanism is constructed to have stoppers formed on the lid and the pivotal shafts for supporting the lid, it is not necessary to independently provide a lid supporting mechanism. Therefore, the lid supporting mechanism of the invention may be constructed with a reduced number of parts, and it is easily manufactured.

What is claimed is:

1. A lid locking mechanism for an automobile switch panel device constructed of an open-top case having a pair of first bearing sections at opposite sides thereof, a switch panel disposed in said open-top case, and a lid to cover said open-top case and having a pair of second bearing sections at opposite sides thereof and each second bearing section including a hole provided therein, and further wherein a shaft means is provided at each first bearing section of said open top case for engagement with one of said holes provided on each side of said lid, said lid locking mechanism comprising:
- a pair of pivotal shafts, each extending from one of said shaft means into a corresponding one of said holes;
- a pair of clutch members, each positioned in one of said holes, such that a clutch member and a pivotal shaft face one another with complimentary engagement faces wherein each clutch member has a clutch surface on said engagement face which is complimentary to a clutch surface on said engagement face of a corresponding one of said pivotal shafts, said clutch surfaces comprising complimentary vertical walls and complimentary inclined surfaces;
- a biasing means for biasing each clutch member toward a corresponding pivotal shaft, such that said lid is maintained in a locked predetermined open angle by cooperative engagement of said clutch surfaces of said clutch member and pivotal shaft with one another, and such that said lid locking mechanism is unlocked when a closing force exceeding a predetermined torque is exerted onto the lid to close the lid;
- wherein each pivotal shaft includes at least one projecting portion extending in the direction of a corresponding clutch member, said projecting portion including said inclined surface on one side thereof and said vertical wall on a circumferentially opposite side thereof, and wherein each clutch member includes a projecting portion complementary to the projecting portion of said pivotal shaft and further includes said inclined surface and said vertical wall, such that said vertical walls from said clutch member and said pivotal shaft abut one another to prevent the opening of the lid in one direction, past said predetermined open angle, and said inclined surfaces allow movement of said lid in a direction opposite said one direction, said vertical walls in the clutch surfaces of the clutch members and pivotal shafts extending in an axial direction with respect thereto.

2. The lid locking mechanism of claim 1, further comprising:
- a pair of stopper means formed on each of said pivotal shafts and each second bearing section of the lid, each of said stopper means formed on said pivotal shafts including a key-shaped stopper member (6c) and a cam-shaped stopper member (6d) having a first vertical wall (6e), and each of said stopper means formed in each of said second bearing sections including a flat surface (3d) and a second vertical wall (3b), such that both said one side surface of said key-shaped surface of said key-shaped stopper member (6c) and said first vertical wall (6e) substantially abut upon said flat surface (3d) and said second vertical wall (3b), respectively, when said lid is locked open at said predetermined angle.

3. The lid locking mechanism of claim 1, wherein said pivotal shafts and said clutch members further include a flat recessed surface between said inclined surface and said vertical wall and said at least one projecting portion including a flat top surface, whereby in the closed position said flat recessed surface of said clutch members is in contact with said flat top surface of said pivotal shafts and said flat recessed surface of said pivotal shafts is in contact with said flat top surface of said clutch members, and in the open position said flat top surfaces of said clutch members and said pivotal shafts are in contact.

* * * * *